Jan. 19, 1965      W. L. HAYES      3,165,938
POWER TRANSMISSION UNIT
Filed Oct. 12, 1960
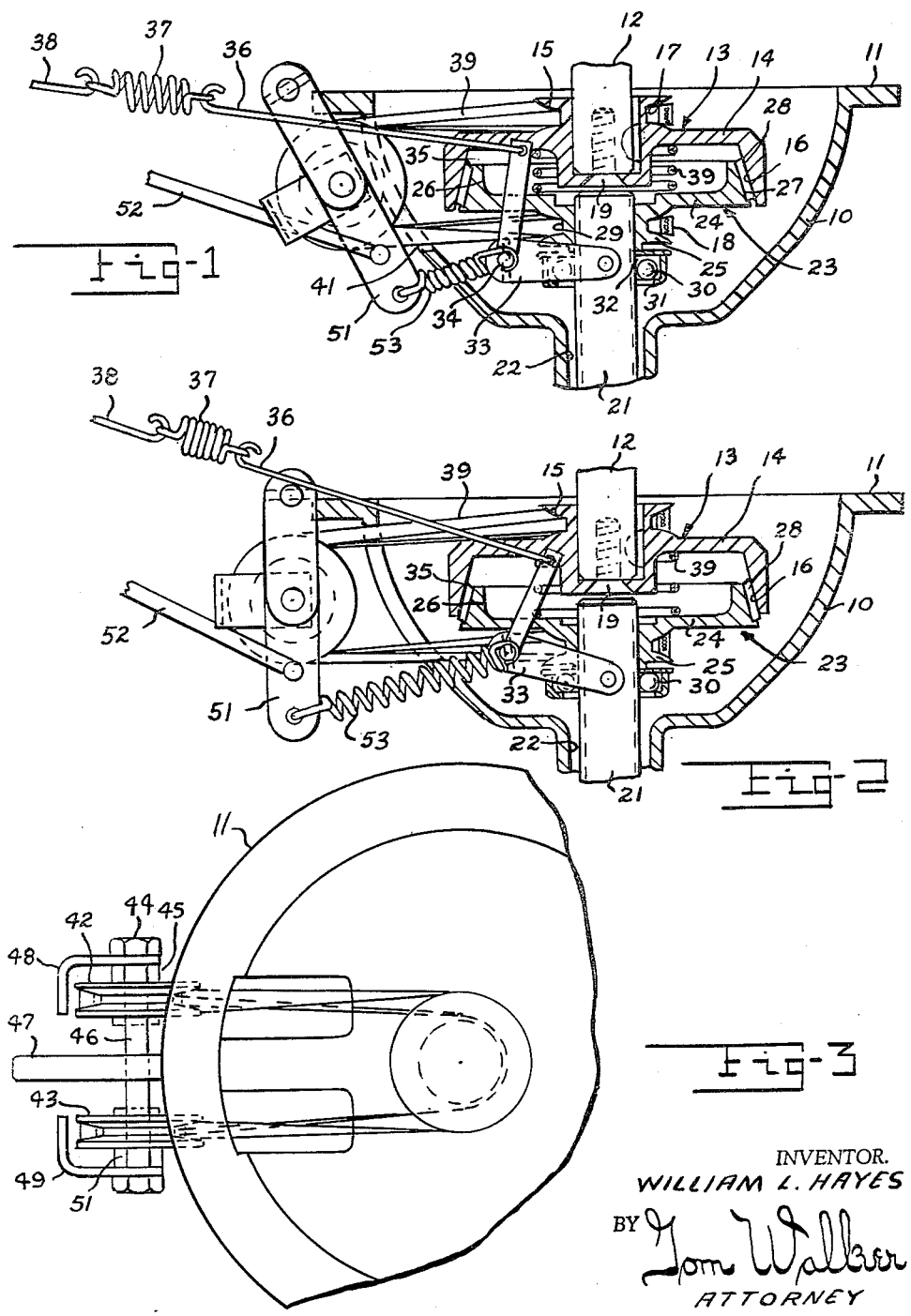
INVENTOR.
WILLIAM L. HAYES
BY Tom Walker
ATTORNEY 3,165,938
POWER TRANSMISSION UNIT
William L. Hayes, New Carlisle, Ohio, assignor to Quick Manufacturing, Inc., Springfield, Ohio, a corporation of Ohio
Filed Oct. 12, 1960, Ser. No. 62,247
11 Claims. (Cl. 74—220)

This invention relates to power transmission and particularly to simple and inexpensive transmission units of especial utility in self-powered tools, for example a garden tiller.

The object of the invention is to simplify the construction as well as the means and mode of operation of power transmission units, whereby such units may not only be economically manufactured, but will be more efficient and satisfactory in use, adaptable to a wide variety of applications, and be unlikely to get out of order.

An object of the invention is to provide a generally new and improved power transmission unit as described particularly adapted for use in vertical tillers and the like wherein the driving and driven shafts are in close coupled end to end relation and vertically disposed with respect to the ground surface.

Another object of the invention is to introduce a principle of dual transmission, or forward and reverse drive, in a unit as described wherein respectively direct and indirect drive means operate under individual controls.

A further object of the invention is to combine in a transmission unit as noted concepts of direct drive, utilizing shiftable clutch elements, and of belt drive each adaped selectively to establish a driving connection between the driving and driven shafts.

Still another object of the invention is to combine the dual drive means of the foregoing in a power transmission unit in which the parts are simply and compactly arranged and protected in a housing adapted to underlie the internal combustion engine conventionally powering garden tilling and like tools.

A further object of the invention is to provide units possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof and the mode of operation as hereinafter described or illustrated in the accompanying drawings, or their equivalents.

Referring to the accompanying drawing wherein is shown one but obviously not necessarily the only form of embodiment of the invention.

FIG. 1 is a view of a power transmission unit in accordance with the illustrated embodiment of the invention, shown in longitudinal section and with the parts adjusted for direct or forward drive;

FIG. 2 is a view similar to FIG. 1, with the parts adjusted for a reverse drive; and FIG. 3 is a fragmentary top plan view of the transmission unit of FIGS. 1 and 2.

Like parts are indicated by similar characters of reference throughout the several views.

Referring to the drawing, the power transmission unit illustratively embodying the invention is a part of a self-powered garden tilling tool as described. The transmission means is essentially contained in or supported by a bowl shaped housing 10 having at its open upper end a flange 11 by which it may be bolted or otherwise secured to the underside of the tool frame or directly to the internal combustion engine powering the tool. The driving torque generated by such engine, or other motive means, is brought to the transmission unit through a rotary drive shaft 12 vertically disposed with respect to the housing 10 and having its one end received in the open upper end of the housing. Mounted on the inner end of the shaft 12, to be contained by the housing 10, is a clutch disc and pulley assembly 13 comprising a unitarily formed disc 14 and a pulley 15. The former is cup shaped and inversely mounted so that its recessed interior faces downward in the housing 10. The interior wall of the disc 14 is conical in shape to present a circular outwardly sloping surface 16.

The pulley portion 15 of the assembly 13 lies adjacent to and above the disc portion 14 and is formed with a groove 17 extending parallel to the disc portion 14 and at right angles to the longitudinal axis of the shaft 12. The clutch disc-pulley assembly 13 is keyed to the shaft 12 for unison rotation therewith. It is, moreover, held to the shaft in a suitable manner against relative longitudinal motion, as by having an integral portion 18 underlying the lower end of the shaft through which a screw stud 19 is passed and anchored in the end of the shaft.

Rotation of the driving shaft 12 is by the instant transmission means imparted to a driven shaft 21 which enters the housing 10 through a reduced diameter opening 22 at the bottom thereof and occupies a position of longitudinal alignment with the shaft 12. The inner end of the shaft 21 is in end to end adjacent relation to the inner end of shaft 12. Mounted on such inner end of the shaft 21 is another clutch disc-pulley assembly 23 comprising a disc 24 and a pulley 25. The assembly 23 is in a lateral plane at right angles to the longitudinal axes of the shafts 12 and 21 and parallel to the plane of the disc-pulley assembly 13. The periphery of disc 24 is turned upward to define a flange 26 adapted to be received within the downwardly facing recessed portion of disc 14. On the exterior of the flange 26 is a sloping surface 27 complementing surface 16 on disc 14 and arranged frictionally to engage such surface through an anti-slip liner 28. The arrangement, it will be understood, is one in which a relative approaching motion of the discs 14 and 24 serves to engage the surfaces 16 and 27 whereby the two discs are clutched together for unison rotation. Correspondingly, a relative separating motion of the discs releases the applied frictional pressures so that the discs are free to turn relatively to one another.

The pulley 25 is a unitary part of the assembly 23 and lies below and adjacent to the disc 24. A groove 29 therein parallels the groove 17 in pulley 15. The assembly 23 is keyed to the shaft 21 for unison rotation therewith. It is slidable on the shaft in a longitudinal sense and rests upon roller bearing means 30 in a housing 31. The latter surrounds shaft 21 beneath disc-pulley assembly 23 and has upper and lower openings for the free passage of the shaft therethrough and to admit a downwardly projecting annular portion 32 of the assembly 23.

The bearing housing 31 is supported by a pair of arms 33 (one shown) which lie on opposite sides of the housing and substantially in the lateral plane thereof and are pivotally connected at their one ends to the exterior of the housing. At their opposite ends the arms 33 are made fast to a rod 34 extending transversely through the housing 10 in a position laterally offset from the shafts 12 and 21 and rotatably supported by the housing. A lever 35 is secured to rod 34 while an actuating rod 36 extends into the housing 10 from the exterior thereof and is attached to the lever 35. The rod 36 is connected by a coil spring 37 to another rod 38 leading from a relatively remote location as for example the handle of the tiller where it is accessible to the hand of the operator. The construction and arrangement of parts is one to place the longitudinally adjustable disc-pulley assembly 23 under control of the operator who by pulling upon the rod 38 rocks lever 35 and arms 33 to elevate bearing housing 31 and thereby thrust the disc-pulley assembly 23 to a driven engagement with the disc 14 in the manner before described. A compression spring 39 is interposed between the discs 14 and 24 and urges the clutch discs normally to a disengaged position and tends to maintain the disc-pulley assembly 23 seated upon the bearing housing 31. The spring 37 interposes a yield in the clutch actuating mechanism whereby the clutch discs are resiliently pressed together. The parts of the direct drive described tend normally to assume the position shown in FIG. 2 where compression spring 39 effects a relative separating motion of the discs 14 and 24 with the result that the driving connection afforded by the interengagement of these members is disabled or made ineffective. In FIG. 1 rod 38 has been actuated to tension spring 37 and to effect an approaching motion of the disc 24 relative to the disc 14 with the result that the clutch is enabled or made effective and a direct driving connection established therethrough from the shaft 12 to the shaft 21. The direction of rotation of the shaft 21 is under the influence of such drive the same as that of the shaft 12.

The pulleys 15 and 25 form a part of a dual, selectively operated transmission means whereby the unidirectional motion of the shaft 12 may effect a counter or reverse rotation of the shaft 21. A continuous belt 39 has parallel portions stretched over the pulleys 15 and 25, in the respective grooves 17 and 29 therein, while the looped ends of the belt are drawn laterally through an opening 41 in the wall of the housing 10 and guided upon respective pulleys 42 and 43 turned approximately 90° from the planes of the pulleys 15 and 25. The pulley 42 is mounted by a nut 44 to the lower end of an arm 45. The latter is secured at its upper end to a transverse shaft 46 rotatably mounted in an external rib 47 on the housing 10 and projecting at its opposite ends to either side of such rib. An angular guard or guide member 48 is clamped between the nut 44 and arm 45 and restrains the belt from disengagement from the pulley 42. A similar guard 49 holds the belt 39 on the pulley 43, the latter being rotatably mounted on an arm 51 secured to the shaft 46 on the opposite side of support 47. Arm 51 is longer than the companion arm 45 and has the pulley 43 connected thereto intermediate its ends. Beyond such point of connection there is attached to the arm 51 a rod 52 as well as one end of a coil spring 53 anchored at its other end to the cross rod 34. Arm 51 serves as a crank to rock the pair of pulleys 42 and 43 in a lateral sense within the looped ends of the belt 39 as to and from the positions shown in FIGS. 1 and 2. Spring 53 urges the assembly normally to the position shown in FIG. 1 where the pulleys 42 and 43 occupy a position within housing opening 41 and wherein the belt 39 slackly engages the pulleys. Rocked outward, however, as to the position shown in FIG. 2, the pulleys 42 and 43 tension the belt 39 so that it runs tightly over the several pulleys 15, 42, 25 and 43. A driving relationship is in this manner established from the shaft 12 to the shaft 21 and it will be observed that on account of the arrangement of the belt and pulley mechanism the rotation of the shaft 21 is reversed with respect to that of the shaft 12.

Tending, as noted, normally to occupy the ineffective position shown in FIG. 1, the crank arm 51 is drawn to the operating position of FIG. 2 by the rod 52 extending from a suitable control location as one of the handles of the tiller. Conveniently, in this regard, both handles of the tiller may be provided with a hand actuated control, one initiating a forward motion and the other reverse. In the absence of actuation of either control the transmission means is inactive and shaft 12 turns without effect upon driven shaft 21. Thus, as has been seen, the spring 39 tends normally to disengage the direct drive provided by clutch discs 14 and 24 while spring 53 tends normally to shift the assembly of which idler pulleys 42 and 43 are a part to a position releasing tension upon belt 39. A retracting or pulling motion exerted upon either rod 38 or 52 establishes the driving connection from the shaft 12 to the shaft 21, the direction of rotation of the driven shaft being selective and the character of the drive being direct or indirect depending upon whether effected through the clutch discs 14 and 24 or through the belt 39.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A dual selectively operated power transmission unit, including longitudinally spaced apart driving and driven shafts, opposing clutch discs on respective shafts relatively adjustable to engage and disengage said driven shaft to and from said driving shaft, supplemental belt drive means between said driving and driven shaft, said belt drive means including idler means adjustable to render said belt drive means effective and ineffective, and control means for adjusting said clutch discs and for adjusting said idler means to drive said driven shaft alternatively through said clutch discs or through said belt drive.

2. A power transmission unit according to claim 1, characterized in that said control means comprises separate and independent control devices.

3. A power transmission unit according to claim 1, characterized by spring means urging said clutch discs normally to a disengaged position.

4. A power transmission unit according to claim 1, characterized in that said belt drive means comprises pulley means on each of said shafts and a belt interconnecting said pulley means, adjustment of said idler means tightening and loosening said belt on said pulley means.

5. A selectively reversible power transmission unit having especial utility in vertical tillers and the like, including longitudinally spaced apart driving and driven shafts, complementary clutch discs mounted on the adjacent ends of the respective shafts for unison rotary motion therewith, one of said discs being shiftable toward and from the other to engage the driven shaft to the driving shaft for direct rotation thereby and to disengage it therefrom, belt means for providing a driving connection between said driving and driven shafts, means for tensioning said belt means to provide the driving connection from said driving to said driven shaft, means normally disabling said tensioning means to prevent operation of said belt means and control means for selectively shifting said one clutch disc and rendering said tensioning means alternately effective and ineffective whereby to selectively drive said driven shaft through said clutch discs or through said belt means.

6. A selectively reversible power transmission unit having an especial utility in vertical tillers and the like including a rotary driving shaft, a relatively rotatable driven shaft in end to end relation to said driving shaft, complementary clutch discs mounted on the adjacent ends of the respective shafts for unison rotary motion therewith, one of said discs being shiftable toward and from the other to engage the driven shaft to the driving shaft for direct rotation thereby and to disengage it therefrom, a belt drive from said driving shaft to said driven shaft, control devices for shifting said one clutch disc and for rendering said belt drive alternately effective and ineffective whereby to drive said driven shaft alternately through said clutch discs or through said belt drive, said belt drive including pulleys on said shafts, a continuous belt in common engagement with said pulleys and forming an intermediate laterally projecting loop and idler means received within the loop of said belt shiftable to tighten and loosen said belt on said pulleys and thereby render said belt drive effective and ineffective as described.

7. A selectively reversible power transmission unit having especial utility in vertical tillers and the like, including relatively rotatable driving and driven shafts in end to end relation, a laterally disposed pulley on each of said shafts connected thereto for unison rotation, a continuous belt having parallel portions engaged with said pulleys and its ends extending laterally of said shafts, idler pulleys received in respective ends of said belt, a unitary mounting for said idler pulleys shiftable to apply and release tension to said belt, complementary clutch discs on adjacent ends of said shaft and connected thereto for unison rotation, one of said discs being shiftable toward the other to establish a direct driving connection between said shafts, and spring means urging said one disc normally away from the other.

8. A power transmission unit according to claim 7 characterized by individual selectively operable controls for shifting the mounting for said idler pulleys and for shifting said one disc toward the other.

9. A power transmission unit, including longitudinally aligned relatively rotatable driving and driven shafts, opposing clutch discs on the adjacent ends of said shafts and connected thereto for unison rotation, one of said discs being longitudinally shiftable relative to the other to engage said discs to establish a direct driving connection between said shafts, a bearing housing in surrounding relatively rotatable relation to one of said shafts in adjacent relation to said one disc, lever means for moving said bearing housing longitudinally to move said one disc toward the other, actuating means for said lever means including a spring stressed by operation of said actuating means to effect engagement of said discs with a yielding pressure, and spring means between said discs opposing motion of said one disc toward the other.

10. A power transmission unit according to claim 9, characterized by a selectively operable indirect drive of said driven shaft by said driving shaft including pulleys forming a part of and rotatable with respective discs, a continuous belt having parallel portions in respective engagement with said pulleys and its ends projecting laterally thereof, and idler pulley means received in the said ends of said belt and shiftable alternatively to tighten and loosen said belt on said pulleys.

11. A selectively reversible power transmission unit for tools having especial utility in vertical tillers and the like, including a bowl shaped housing adapted to be mounted on the underside of the tool, a driving shaft entering the open end of said housing, a driven shaft in end to end aligned relation to said driving shaft within said housing and extending through and beyond said housing at the closed end thereof, complementary clutch discs on the adjacent ends of said shafts for unison rotation with their respective shafts, one of said discs being shiftable to engage the driven shaft to the driving shaft for direct rotation thereby and to disengage it therefrom, a laterally disposed pulley on each of said shafts connected thereto for unison rotation, idler pulley means on the exterior of said housing, an adjustable mounting therefor, belt means in common engagement with said laterally disposed pulleys and with said idler pulley means, adjustment of said adjustable mount tightening and loosening said belt means to establish a selective driving relationship between said driving and driven shafts through said pulleys and belt means, said housing having a lateral opening for passage of said belt means therethrough, and dual selectively operable control linkages for the remote operation of said transmission unit, one extending through said lateral opening into said housing and operable to shift said one disc and the other terminating at said idler pulley means and operable to adjust said adjustable mount.

References Cited in the file of this patent
UNITED STATES PATENTS

| | | |
|---|---|---|
| 1,823,493 | Hubbard | Sept. 15, 1931 |
| 2,167,450 | Ginsburg | July 25, 1939 |
| 2,660,068 | Emrick | Nov. 24, 1953 |
| 2,809,533 | Emrick | Oct. 15, 1957 |